US007774015B2

(12) United States Patent  
Madine et al.

(10) Patent No.: US 7,774,015 B2  
(45) Date of Patent: Aug. 10, 2010

(54) POWER CONTROL APPARATUS AND METHOD FOR SUPPORTING SEAMLESS MOBILITY

(75) Inventors: Mary M Madine, Tempe, AZ (US); Colin G. Dunlop, Queen Creek, AZ (US); Joseph C. Sligo, Chandler, AZ (US)

(73) Assignee: General Instrument Corporation, Horsham, PA (US)

( * ) Notice: Subject to any disclaimer, the term of this patent is extended or adjusted under 35 U.S.C. 154(b) by 735 days.

(21) Appl. No.: 11/609,139

(22) Filed: Dec. 11, 2006

(65) Prior Publication Data

US 2008/0139117 A1 Jun. 12, 2008

(51) Int. Cl.  
*H04B 7/00* (2006.01)

(52) U.S. Cl. .............. 455/522; 455/41.2; 455/13.4; 455/572; 455/574; 370/311; 340/1.01

(58) Field of Classification Search ........... 455/522.1, 455/41.1, 572, 574, 13.4, 127.5; 307/311; 340/1.01, 572.1; 370/311  
See application file for complete search history.

(56) References Cited

U.S. PATENT DOCUMENTS

| 7,116,938 | B2 * | 10/2006 | Monroe et al. ............ 455/41.2 |
| 7,194,642 | B2 * | 3/2007 | Pontarelli ................. 713/320 |
| 7,215,976 | B2 * | 5/2007 | Brideglall ................ 455/552.1 |
| 7,570,613 | B2 * | 8/2009 | Benveniste ............... 370/328 |
| 2003/0104848 | A1 * | 6/2003 | Brideglall ................ 455/574 |
| 2005/0034001 | A1 * | 2/2005 | Pontarelli ................. 713/320 |
| 2005/0066208 | A1 * | 3/2005 | Koie et al. ................. 713/320 |
| 2005/0237984 | A1 * | 10/2005 | Benveniste ............... 370/338 |
| 2006/0088018 | A1 * | 4/2006 | Black et al. ............... 370/338 |
| 2006/0276161 | A1 * | 12/2006 | Twitchell ................ 455/343.1 |
| 2007/0037568 | A1 * | 2/2007 | Warner et al. ............ 455/422.1 |
| 2008/0003946 | A1 * | 1/2008 | Lee et al. ................. 455/41.2 |
| 2008/0025279 | A1 * | 1/2008 | Young et al. .............. 370/341 |
| 2008/0114604 | A1 * | 5/2008 | Wei et al. ................. 704/275 |
| 2008/0130603 | A1 * | 6/2008 | Wentink et al. ........... 370/338 |
| 2008/0140868 | A1 * | 6/2008 | Kalayjian et al. .......... 710/8 |
| 2008/0280676 | A1 * | 11/2008 | Distanik et al. ............ 463/29 |
| 2008/0291855 | A1 * | 11/2008 | Bata et al. ................. 370/311 |
| 2009/0003620 | A1 * | 1/2009 | McKillop et al. .......... 381/80 |
| 2009/0040041 | A1 * | 2/2009 | Janetis et al. ........... 340/539.13 |
| 2009/0137206 | A1 * | 5/2009 | Sherman et al. .......... 455/41.2 |
| 2009/0196209 | A1 * | 8/2009 | Haartsen ................. 370/311 |
| 2009/0213773 | A1 * | 8/2009 | Yoon et al. ................ 370/311 |

FOREIGN PATENT DOCUMENTS

JP 2004147012 A * 5/2004

* cited by examiner

*Primary Examiner*—Minh D Dao  
(74) *Attorney, Agent, or Firm*—Stewart M. Wiener

(57) ABSTRACT

A power control device (18), for use with a WPAN host device (10), and a method (30) for supporting seamless mobility in transferring content between a WPAN-enabled device and the host device, such as between a Bluetooth-enabled information source and a Bluetooth-enabled host device. The host device includes a WPAN module (14), an on/off control module (16) and the power control device or module (18). The power control module (18) includes a power source (24) for powering a controller (22) that instructs the on/off control module to turn on the host device if the host device is turned off and if a WPAN information source has a WPAN master/slave relationship with the host device. The controller also can instruct the on/off control module to turn off the host device if the WPAN information source no longer has a WPAN master/slave relationship with the host device.

12 Claims, 4 Drawing Sheets

POWER CONTROL APPARATUS AND METHOD FOR SUPPORTING SEAMLESS MOBILITY

BACKGROUND OF THE INVENTION

1. Field of the Invention

The invention relates to wireless connectivity and data transfer apparatus and methods. More particularly, the invention relates to data transfer between electronic devices, including mobile and consumer electronic devices, in a seamless manner.

2. Description of the Related Art

The ability to wirelessly transfer information between devices, including handheld mobile devices and consumer electronic devices, continues to expand in new ways and improve in existing ways. Such ability to transfer information has been enhanced in recent years with the advent and evolution of several near field or near range technologies, including Bluetooth™ and Bluetooth-enabled devices. Bluetooth refers to an industry standard for short range wireless connectivity and data transfer within personal area networks (PANs), also referred to as piconets. The Bluetooth standard, which also is known by the IEEE standard 802.15.1, allows devices, such as desktop personal computers (PCs), laptop or notebook PCs, PC printers, digital cameras and personal digital assistants (PDAs), to connect, communicate and exchange information wirelessly in a relatively secure and inexpensive manner using short range radio frequency (RF).

For example, if a person is listening to music on a Bluetooth-enabled mobile device, the person can turn on their car and the Bluetooth-enabled car radio can accept the music from the mobile device and play the music through the speakers of the car radio. In this manner, the transfer of information between the mobile device and the car radio device is relatively seamless, i.e., continuous and almost automatic and relatively trouble-free.

However, when using such near range wireless-enabled devices to transfer information, the receiving (slave) device has to be turned on to receive information. If the receiving device is turned off or is in some sort of standby mode, data transfer from the transmitting (master) device to the receiving device can not occur. Therefore, for example, if the person in the previously-described scenario wants to transfer music content from the mobile device to one or more devices in the person's home, the receiving device in the person's home needs to be turned on for such transfer to occur. If the receiving device in the person's home is not turned on, that receiving device will not receive any data from the transmitting device.

DETAILED DESCRIPTION

Figure 1:
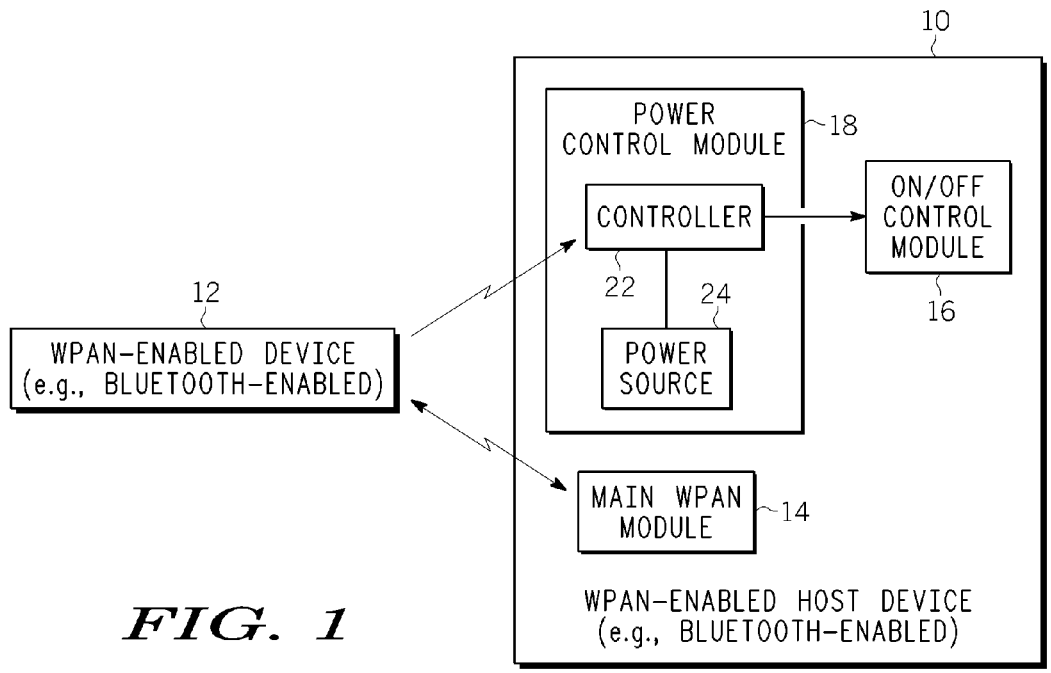
FIG. 1 is a block diagram of a wireless PAN (WPAN) or WPAN-enabled host device (e.g., a Bluetooth-enabled host device) including power control for supporting seamless mobility between the host device and other WPAN-enabled devices.

In the following description, like reference numerals indicate like components to enhance the understanding of the power control devices and methods through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

It should be understood that, although many of the devices discussed herein are shown and described as Bluetooth devices and Bluetooth-enabled devices, the devices herein discussed are suitable for use with any suitable near range or wireless personal area network (WPAN) technology or technologies. Such WPAN technologies include but are not limited to ZigBee, Ultra Wideband, Wireless USB, Z-wave, the Infrared Data Association (IrDA), nanoNET, any suitable technologies and enabled devices in accordance with the Wi-Fi standards, and any suitable technologies and enabled devices in accordance with the 802.11 family of standards.

Referring now to FIG. 1, shown is a block diagram of a WPAN or WPAN-enabled (e.g., Bluetooth-enabled) host device 10 including power control for supporting seamless mobility between the host device 10 and other WPAN-enabled information sources and devices 12, such as a Bluetooth-enabled information source or device. As discussed hereinabove, Bluetooth technology refers to an industry standard that allows Bluetooth-enabled devices within a personal area network or piconet to connect, communicate and exchange information wirelessly in a relatively secure and inexpensive manner using short range radio frequency (RF) in a globally-available frequency band (2.4 gigahertz).

Each of the host device 10 and the WPAN-enabled device 12 can be any suitable device capable of being WPAN enabled or Bluetooth enabled, such as a television, a stereo, a desktop personal computer (PC), a laptop or notebook PC, a PC printer, a computer keyboard or mouse, a headset, a mobile telephone, a camera telephone, or a personal digital assistant (PDA). Either of the host device 10 and the WPAN-enabled device 12 also can be any suitable data or video content or other information processing device, such as a residential gateway, a home media server system, a signal converter or decoder (set-top) box, an internet protocol (IP), satellite or cable digital video recorder, a personal video recorder (PVR), a digital video disc (DVD) player, a videocassette recorder (VCR), a gaming console, a camcorder, a video and/or audio receiver, and other suitable A/V sources or consumer equipment.

The host device 10 can be partially or completely configured in the form of hardware circuitry and/or other hardware components within a larger device or group of components. Alternatively, the host device 10 can be partially or completely configured in the form of software, e.g., as processing instructions and/or one or more sets of logic or computer code. In such configuration, the logic or processing instructions typically are stored in a data storage device (not shown), which typically is coupled to a processor or controller (not shown). The processor accesses the necessary instructions from the data storage device and executes the instructions or transfers the instructions to the appropriate location within the host device 10.

The host device 10 includes a main WPAN module 14, an on/off control module 16 coupled to the WPAN module 14, and a power control module 18. As will be discussed in greater detail hereinbelow, the power control module 18 includes a controller 22, which is coupled to the on/off control module 16, and a power source 24 coupled to the controller 22. One or more of the main WPAN module 14, the on/off control module 16, and the power control module 18 can be comprised partially or completely of any suitable structure or arrangement, e.g., one or more integrated circuits. Also, it should be understood that the host device 10 includes other components, hardware and software (not shown) that are used for the operation of other features and functions of the host device 10 not specifically described herein.

The main WPAN module 14 contains the necessary components and/or hardware and/or software and/or firmware to allow the host device 10 to be WPAN-enabled. That is, in general, the main WPAN module 14 allows the host device 10 to connect, communicate and exchange information wirelessly with other WPAN-enabled devices, such as the WPAN-enabled device 12 and/or other WPAN information sources, such as Bluetooth-enabled information sources.

The on/off control module 16 controls the power being supplied to the host device 10, including the main WPAN module 14. Typically, the on/off control module 16 turns the host device 10 on and off by switching between an on state and an off state. When host device 10 is in the on state, power is supplied to the host device 10 and the host device 10 can establish connections with other WPAN-enabled devices and receive information wirelessly from other WPAN-enabled devices, as well as perform other host device operations. When the host device 10 is in the off state, no power or an insufficient amount of power is supplied to the host device 10. When turned off, the host device 10 can not receive information from other WPAN-enabled devices, as discussed previously herein.

Therefore, conventionally, for a conventionally-configured WPAN-enabled host device to be part of a seamless mobility scenario, i.e., to always be capable of receiving information without interruption, the host device needs to be turned on or powered on at all times. However, keeping the host device turned on at all times may not be possible and often is impractical for an end user.

Unlike conventionally-configured WPAN-enabled host devices, the host device 10 includes the power control module 18, which includes the controller 22 and the power source 24. The power source 24 can be a low power source or battery, e.g., a rechargeable battery, or other suitable power source that can always supply power to the controller 22 and for the power control module 18.

In general, the power control module 18 continuously listens for WPAN commands and information, e.g., from a WPAN information source like the WPAN-enabled device 12. Based on the received WPAN information, the power control module 18 controls the power operation of the on/off control module 16 to either power the host device 10 on or off, thus controlling the ability of the host device 10 to receive or otherwise communicate with other WPAN-enabled devices, such as the WPAN-enabled device 12 and/or other WPAN information sources. In this manner, the power control module 18 provides an alternative to always leaving the host device powered on, yet still allowing for the host device to be part of seamless WPAN experiences.

The power control module 18 can be partially or completely configured in the form of hardware circuitry and/or other hardware components within a larger device or group of components. Alternatively, the power control module 18 can be partially or completely configured in the form of software, e.g., as processing instructions and/or one or more sets of logic or computer code. In such configuration, the controller 22 or other suitable components in the power control module 18 accesses the necessary instructions and executes the instructions or transfers the instructions to the appropriate location within the power control module 18.

The power control module 18 can be contained in the host device 10, although such is not necessary. Also, although the power control module 18 is shown as a separate component from the main WPAN module 14 in the host device 10, the power control module 18 can be part of the main WPAN module 14. For example, the power control module 18 can be embedded or otherwise contained in the main WPAN module 14, as shown in the host device 10 in FIG. 2.

Figure 2:
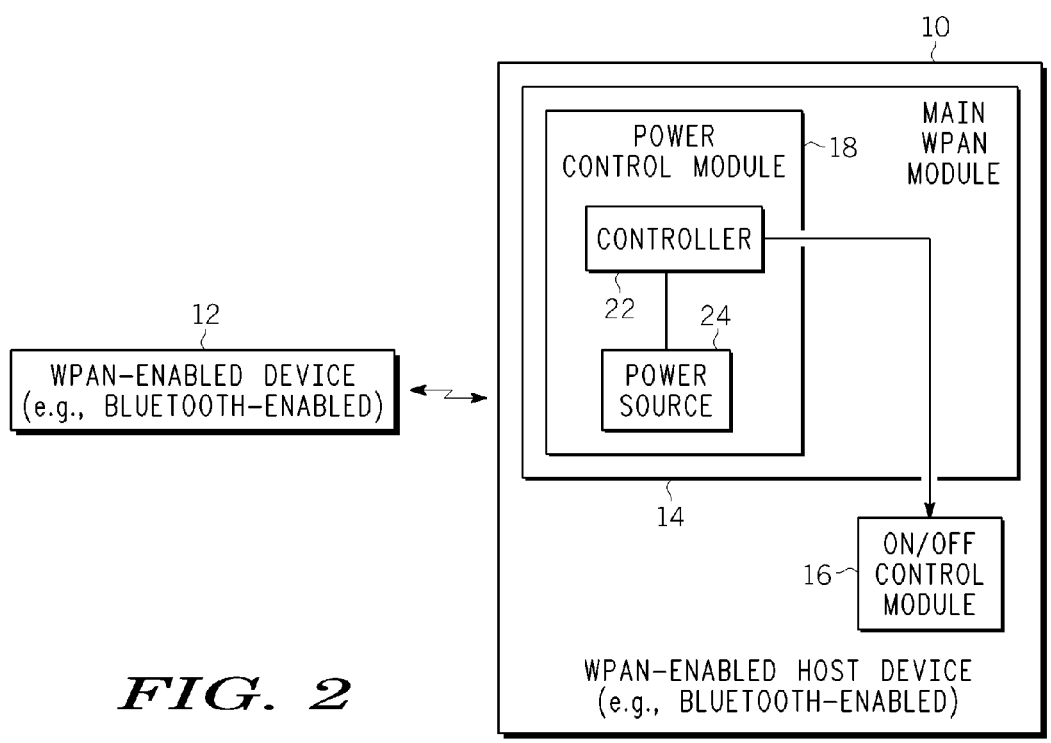
FIG. 2 is a block diagram of an alternative configuration of a WPAN-enabled host device including power control for supporting seamless mobility between the host device and other WPAN-enabled devices.
Figure 3:
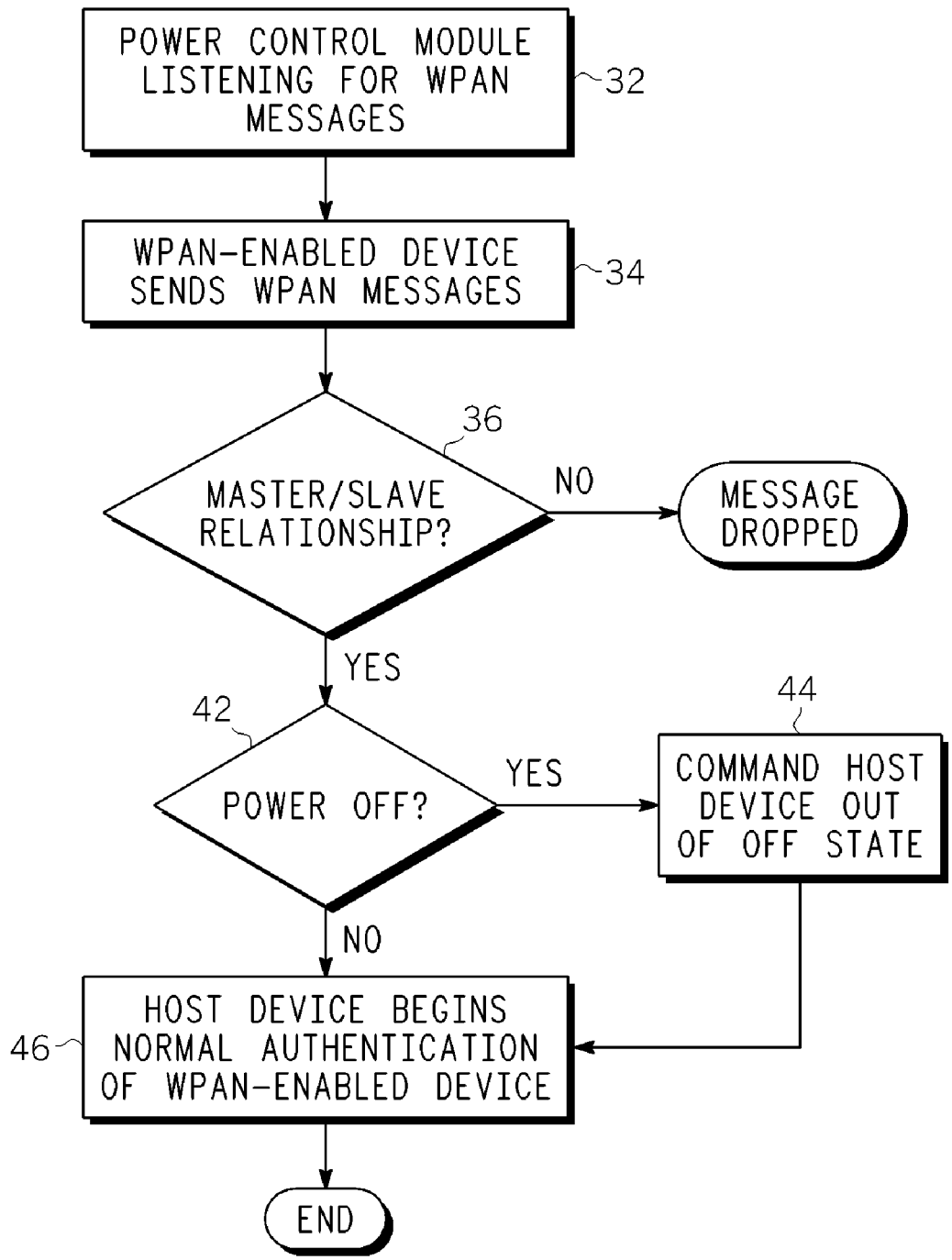
FIG. 3 is a flow chart that schematically illustrates a method for supporting seamless mobility between WPAN-enabled devices.

Referring now to FIG. 3, with continuing reference to FIG. 1 and FIG. 2, shown is a flow chart that schematically illustrates a method 30 for supporting seamless mobility between WPAN-enabled devices, such as between a Bluetooth-enabled host device and a Bluetooth-enabled information source. The method 30 will be described along with the operation of the host device 10 and the WPAN information source device 12.

The method 30 includes a step 32 of the power control module 18 (or other suitable component or components of the host device 10) listening for WPAN information, e.g., Bluetooth messages or other information. As discussed, the power source 24 within the power control module 16 continuously powers the power control module 18, even when the host device 10 is powered off. Therefore, even when of the host device is powered off (i.e., in an off state), the power control module 18 can still listen for WPAN information.

The method 30 also includes a step 34 in which the WPAN-enabled device 12 sends WPAN commands, messages or other information. As discussed hereinabove, the WPAN-enabled device 12 can be any suitable source of WPAN information. When the host device 10 receives WPAN information, such as a message and/or inquiry, a step 36 is performed in which the host device 10 determines whether the received WPAN information is from a device with which the host device 10 has a WPAN transmit/receive or master/slave relationship. That is, the step 36 determines if the transmitting device is a WPAN-enabled device that is properly within the operable range of the WPAN and that is transmitting WPAN information that is proper for the host device 10 to receive.

For example, if the host device 10 is a Bluetooth-enabled host device and the WPAN-enabled device 12 is a Bluetooth information source, the step 36 may determine if there is a pairing or piconet formed between the two devices. However, it should be understood that, with Bluetooth-enabled devices and/or other WPAN-enabled devices, there does not have to be a pairing or piconet formed between the devices for the step 36 to determine that a proper WPAN transmit/receive or master/slave relationship exists between the devices. For example, the host device 10 may prompt the WPAN-enabled device 12 and receive an appropriate response therefrom before the host device 10 determines that a proper transmit/receive or master/slave relationship is established. However, depending on the WPAN technology employed, there may not have to be a pairing or prompt before the host device 10 determines that a proper WPAN transmit/receive or master/slave relationship exists with the transmitting device 12.

If the WPAN information received by the host device 10 is not from a device with which the host device 10 has a WPAN transmit/receive or master/slave relationship, the WPAN message is dropped. If the determining step 36 determines that a proper WPAN transmit/receive or master/slave relationship exists between the host device 10 and the WPAN information source 12, the method 30 performs a step 42 in which the power control module 18 checks or determines whether the host device 10 is powered on. If the power control module 18 determines that the host device 10 currently is powered off, the method 30 performs a step 44 in which the power control module 18 sends a signal or otherwise instructs the on/off control module 16 to power on the host device 10, i.e., to command the host device 10 out of the off state.

Once the on/off control module 16 powers on the host device 10, or if the host device 10 already is powered on, the method 30 includes a step 46 in which the host device 10 begins authentication of the WPAN-enabled device 12. Such authentication typically is a conventional step in the process of exchanging information between WPAN-enabled devices, e.g., between Bluetooth-enabled device according to the Bluetooth standard.

Figure 4:
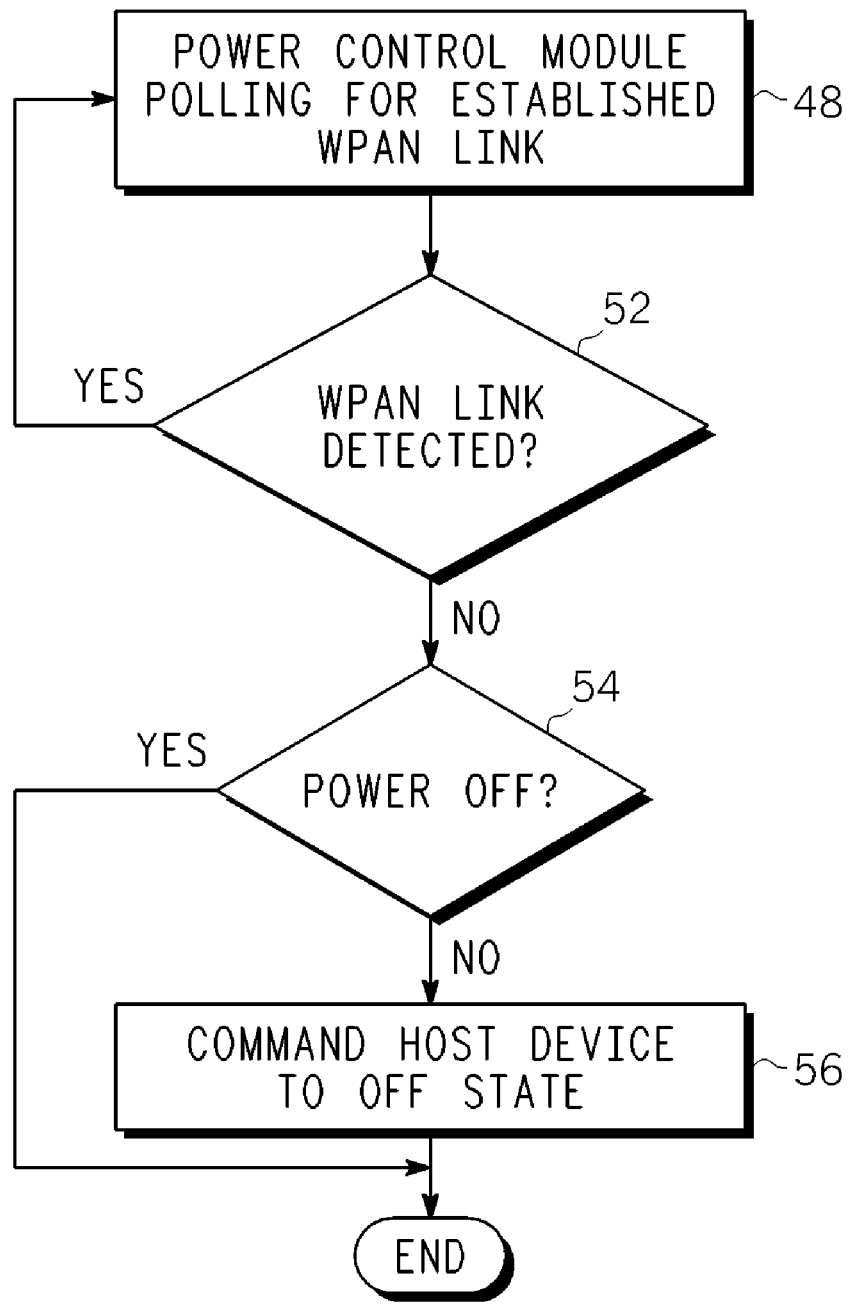
FIG. 4 is a flow chart that schematically illustrates another portion of the method for supporting seamless mobility between WPAN-enabled devices.

Referring now to FIG. 4, shown is a flow chart that schematically illustrates an additional portion of the method 30 for supporting seamless mobility between WPAN-enabled devices, such as between a Bluetooth-enabled host device and a Bluetooth-enabled information source. The portion of the method 30 shown in FIG. 4 typically is performed once active data transmission occurs between the information source 12 and the host device 10, although such is not necessary. In addition to the step 32 (shown in FIG. 3) of the power control module 18 listening for WPAN information, the method 30, as shown in FIG. 4, also includes a step 48 in which the power control module 18 (or other suitable component or components of the host device 10) polls for established WPAN links between the host device 10 and an accepted or proper WPAN-enabled device. For example, if the host device 10 is a Bluetooth-enabled device, the power control module 18 would be polling for established Bluetooth links with other Bluetooth-enabled devices that are acting as information sources.

As long as the power control module 18 detects an established WPAN link (shown as a step 52), the polling step 48 will continued to be performed, i.e., the power control module 18 will continue to poll for established WPAN links. However, if the power control module 18 no longer detects an established WPAN link, the method 30 includes a step 54 in which the power control module 18 checks or determines whether the host device 10 is powered off. If the power control module 18 determines that the host device 10 currently is powered on, the method 30 performs a step 56 in which the power control module 18 sends a signal or otherwise instructs the on/off control module 16 to power off the host device 10. For example, if the power control module 18 detects a period of inactivity between a previously-existing transmit/receive relationship between a WPAN-enabled information source and the host device, i.e., if the information source is taken out of the operable range of the WPAN, the power control module 18 can power off the host device, if the host device is not already powered off, e.g., for some other reason.

It should be understood that the portion of the steps of the method 30 shown in FIG. 3 and the portion of the steps of the method 30 shown in FIG. 4 can be performed in any particular order with respect to one another. For example, the determining step 36 shown in FIG. 3 and the polling step 48 and the detecting step 52 shown in FIG. 4 can all be performed in any suitable order or can be performed simultaneously. Moreover, the implementation of the determining step 36, the polling step 48 and the detecting step 52 can be similar or the same. That is, the power control module 18 can be configured to listen for WPAN messages and to poll for established WPAN links.

In general, as an example scenario, a person walking around and enjoying music on a mobile device can get into their car, turn on the car, and, via conventional Bluetooth technology, continue to enjoy their music seamlessly over the speakers of the car radio. However, the person may want to continue the seamless experience in their home via their home stereo system. Conventionally, the seamless experience can be continued only if the person's home stereo system already is powered on.

However, if the person's home stereo system is a host device 10 as described hereinabove, the home stereo system would not have to be already powered on. When the Bluetooth-enabled mobile device comes into range of the home stereo system, the power control module 18 sends a signal to the on/off control module 16 to power on the home stereo system. Once the home stereo system is powered on, the main WPAN module 14 performs the necessary processes for content transfer, e.g., in a conventional manner.

With respect to the configuration of the host device 10, as discussed hereinabove, the power control module 18 can be embedded or contained within the host device 10. Moreover, the power control module 18 can be embedded in or can be a portion of the main WPAN module 14, as shown in FIG. 2, or can be external to the main WPAN module 14, as shown in FIG. 1. However, alternatively, the power control module 18 can be part of a WPAN-enabled control device that is separate from the host device that is being controlled.

Figure 5:
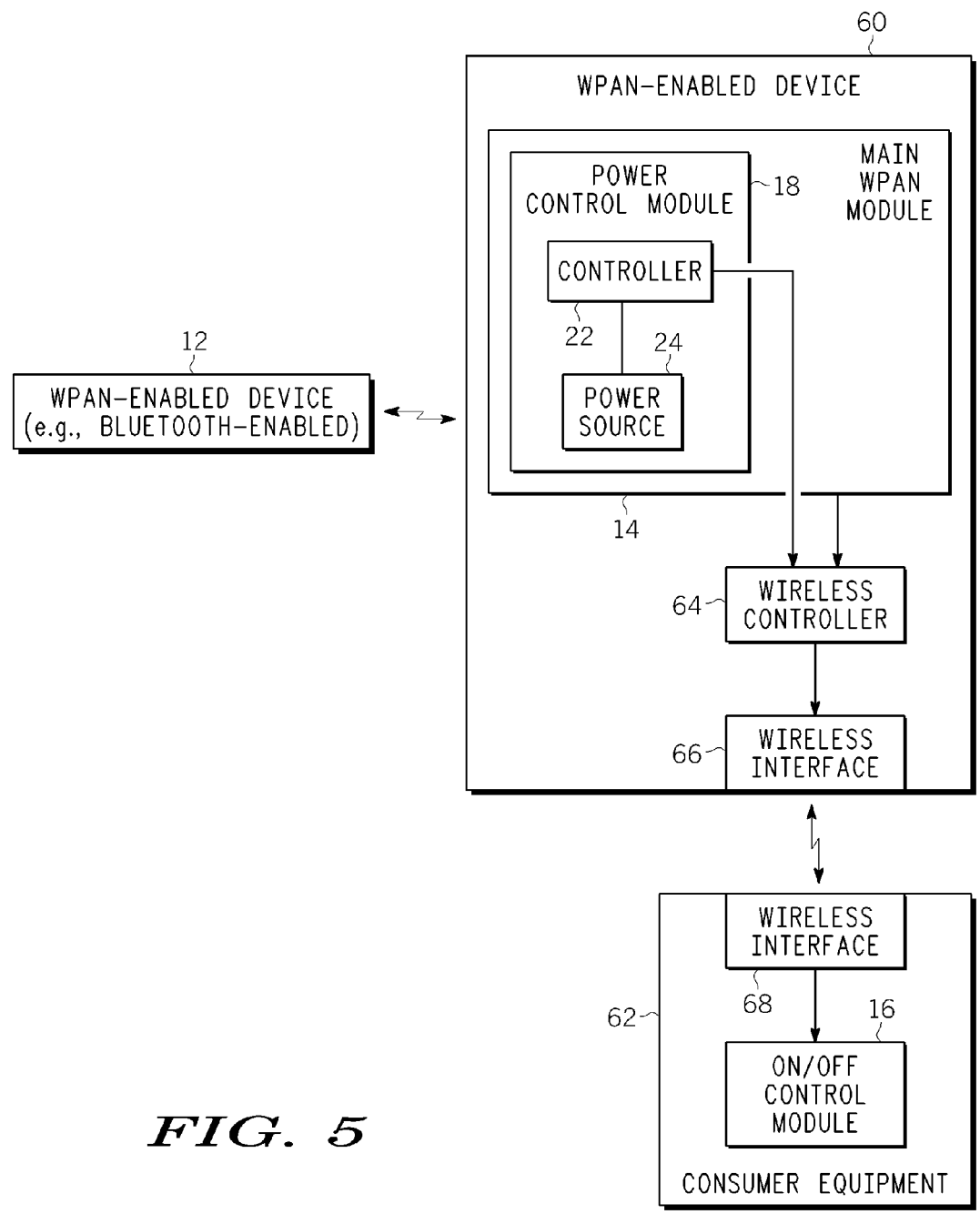
FIG. 5 is a block diagram of yet another alternative configuration of a WPAN-enabled host device including power control for supporting seamless mobility between the host device and other WPAN-enabled devices.

For example, referring to FIG. 5, shown is a block diagram of a WPAN or WPAN-enabled device 60 including power control for supporting seamless mobility between a host device 62 and other devices, such as the WPAN-enabled device 12. Unlike the host device 10 shown in FIG. 1 and FIG. 2 and described hereinabove, the WPAN-enabled device 60 is a standalone power control device that is not part of the host device 62.

The device 60 includes the main WPAN module 14 and the power control module 18, like the device 10. Although the power control module 18 is shown embedded or otherwise contained in the main WPAN module 14, such is not necessary. For example, the power control module 18 can be a separate component from the main WPAN module 14.

However, unlike the host device 10 shown in FIG. 1 and FIG. 2, the device 60 also includes a wireless controller 64 coupled to the power control module 18 and the main WPAN module 14, and a wireless interface 66 coupled to the wireless controller 64. The wireless controller 64 can be any suitable wireless controller, such as an infrared controller or a radio frequency (RF) controller. Correspondingly, the wireless interface 66 can be any suitable wireless interface, such as an infrared interface or an RF interface.

In operation, the device 60 recognizes the presence of WPAN-enabled devices, e.g., the WPAN-enabled device 12, and WPAN commands, messages and other information that may be sent therefrom, e.g., as discussed hereinabove with respect to device 10. However, the device 60 also translates those WPAN commands and/or presence indications, e.g., via the wireless controller 64, into control commands suitable for transmission from the device 60 to the host device 62 via the wireless interface 66. The host device 62 is similarly equipped with wireless remote control capability, including a wireless interface 68, which is coupled to the on/off control module 16. Therefore, the device 60 can include power control of the host device 62 and support seamless WPAN mobility from a standalone device external to the host device 62. As with the wireless interface 66 in the device 60, the wireless interface 68 in the host device 62 can be any suitable wireless interface, such as an infrared interface or an RF interface.

The method shown in FIG. 3 and FIG. 4 described herein may be implemented in a general, multi-purpose or single purpose processor. Such a processor will execute instructions, either at the assembly, compiled or machine-level, to perform that process. Those instructions can be written by one of ordinary skill in the art following the description of the data traffic routing method described herein and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the apparatus and method for providing seamless mobility between devices herein described without departing from the spirit and scope of the invention as defined by the appended claims and their full scope of equivalents.

The invention claimed is:

1. A wireless personal area network (WPAN) host device, comprising:
   a WPAN module configured to receive WPAN information from a WPAN information source;
   an on/off control module coupled to the WPAN module for switching the host device between an on state in which WPAN information can be received by the WPAN module and an off state in which WPAN information can not be received by the WPAN module; and
   a power control module coupled to the on/off control module, wherein the power control module includes
      a controller coupled to the on/off control module, wherein the controller is configured to receive at least one WPAN command from the WPAN information source, and
      a power source coupled to the controller for supplying power to the controller,
   wherein, when the controller receives at least one WPAN command from the WPAN information source,
      if the WPAN information source has a WPAN master/slave relationship with the host device, and
      if the host device is in the off state,
      the controller instructs the on/off control module to switch the host device to the on state wherein the WPAN module can begin receiving WPAN information from the WPAN information source.

2. The device as recited in claim 1, wherein the WPAN host device further comprises a Bluetooth-enabled host device, and wherein the WPAN information source further comprises a Bluetooth information source.

3. The device as recited in claim 2, wherein the WPAN master/slave relationship further comprises at least one of having a Bluetooth piconet between the WPAN host device and the WPAN information source and having a pairing between the WPAN host device and the WPAN information source.

4. The device as recited in claim 1, wherein the power control module is embedded in the WPAN module.

5. The device as recited in claim 1, wherein the power source is configured to remain in a powered-up state that continuously supplies power to the controller in such a way that the controller can continuously receive WPAN commands from the WPAN information source.

6. The device as recited in claim 1, wherein at least one of the WPAN module and the power control module is contained within the host device.

7. The device as recited in claim 1, wherein the power control module is wirelessly coupled to the on/off control module via a wireless controller and at least one wireless interface.

8. The device as recited in claim 1, wherein, if the host device determines that the WPAN information source no longer has a WPAN master/slave relationship with the host device, and if the host device is in the on state, the controller instructs the on/off control module to switch the host device to the off state.

9. A power control module for use with a WPAN host device, the host device having an on state in which WPAN information can be received by the host device and an off state in which WPAN information can not be received by the host device, the module comprising:
   a controller configured to receive at least one WPAN command from a WPAN information source;
   a power source coupled to the controller for supplying power to the controller,
   wherein, when the controller receives at least one WPAN command from the WPAN information source,
      if the WPAN information source has a WPAN master/slave relationship with the host device, and if the host device is in the off state, the controller instructs the host device to switch to the on state to begin receiving WPAN information from the WPAN information source; and
   wherein the power control module is wirelessly coupled to the host device via a wireless controller and at least one wireless interface.

10. The module as recited in claim 9, wherein the WPAN host device further comprises a Bluetooth-enabled host device, and wherein the WPAN information source further comprises a Bluetooth information source.

11. The module as recited in claim 9, wherein the power control module is contained within the host device.

12. A computer program embodied in a non-transitory computer-readable storage medium, the program comprising instructions executable by a processor of a power control module that is wirelessly coupled to a WPAN host device via a wireless controller and at least one wireless interface for receiving WPAN information from the WPAN host device, the instructions comprising:
   instructions for receiving WPAN messages by the WPAN host device from a WPAN information source;
   instructions for determining if the WPAN information source has a WPAN master/slave relationship with the WPAN host device;
   instructions for determining if the WPAN host device is in an off state in which the WPAN host device can not receive WPAN information from the WPAN information source; and
   instructions for switching the WPAN host device to an on state if the WPAN information has a WPAN master/slave relationship with the host device, and if the host device is in the off state;
   wherein, when the WPAN host device is in the on state, the WPAN host device can receive WPAN information from the WPAN information source.

* * * * *